United States Patent [19]

Hill et al.

[11] 4,450,529

[45] May 22, 1984

[54] METHOD AND APPARATUS FOR DETERMINING ENCODER ACCURACY MARGIN IN A WHEEL BALANCER

[75] Inventors: Jerry M. Hill, North Little Rock; Joel T. Lipe, Little Rock, both of Ark.

[73] Assignee: FMC Corporation, Chicago, Ill.

[21] Appl. No.: 172,723

[22] Filed: Jul. 28, 1980

[51] Int. Cl.³ .................... G01M 1/22; G06F 15/20
[52] U.S. Cl. .................... 364/508; 73/462; 364/571; 377/19
[58] Field of Search .................. 73/462, 459; 364/571, 364/508; 340/347 P, 347 CC; 250/231 SE; 318/570; 377/19

[56] References Cited

U.S. PATENT DOCUMENTS

| | | | |
|---|---|---|---|
| 3,741,016 | 6/1973 | Hofmann | 73/462 |
| 3,760,170 | 9/1973 | Weber, Jr. | 318/570 |
| 3,785,210 | 1/1974 | Müller | 73/459 |
| 3,788,147 | 1/1974 | Müller | 73/459 |
| 3,826,146 | 7/1974 | Muller | 73/462 |
| 3,983,391 | 9/1976 | Clemons | 250/231 SE X |
| 4,015,480 | 4/1977 | Giers | 73/462 |
| 4,046,017 | 9/1977 | Hill | 73/462 |
| 4,085,619 | 4/1978 | Shapiro et al. | 73/462 |
| 4,155,255 | 5/1979 | Sherman et al. | 73/462 |
| 4,169,383 | 10/1979 | Guyot et al. | 73/462 |
| 4,173,146 | 11/1979 | Kögler et al. | 73/462 |
| 4,194,184 | 3/1980 | Hartmann et al. | 340/347 P |
| 4,250,555 | 2/1981 | Mitchell et al. | 73/462 X |
| 4,285,240 | 8/1981 | Gold | 73/462 |

FOREIGN PATENT DOCUMENTS

1511141 5/1978 United Kingdom ............... 73/462

Primary Examiner—Felix D. Gruber
Attorney, Agent, or Firm—H. M. Stanley; R. B. Megley

[57] ABSTRACT

An off the car wheel unbalance measuring system has a rotationally driven wheel mounting shaft supported in a framework pedestal together with a pair of force transducers mounted in the pedestal and in mechanical communication with and spaced along the shaft. The angular position of the shaft is monitored with respect to an angular reference position at a predetermined number of angular increments during each full revolution of the shaft by a shaft encoder. The encoder provides a reference pulse once each shaft revolution and a plurality of angular shaft position increment pulses each shaft revolution. The angular increment pulses are in the form of a dual signal the components of which have a predetermined phase relationship. The shaft reference pulse and the angular increment pulse are required to provide a reference indication as well as a predetermined number of angular increment indications in each shaft revolution. The encoder outputs are also observed to determine that the dual signal phasing is correct and the reference indication is further used to ascertain that the shaft speed is within a predetermined speed range.

17 Claims, 8 Drawing Figures

FIG_5

FIG_6A

FIG_6B

FIG_7

METHOD AND APPARATUS FOR DETERMINING ENCODER ACCURACY MARGIN IN A WHEEL BALANCER

BACKGROUND OF THE INVENTION

1. Field of the Invention

This invention relates to a method and apparatus for monitoring the operation of a shaft encoder associated with a rotating shaft and more particularly to a method which provides the capability of undertaking certain self-diagnostic tests relative to the encoder.

2. Description of the Prior Art

A wheel balancing apparatus is disclosed in U.S. Pat. No. 4,285,240, Gold, issued Aug. 25, 1981 commonly owned by the Assignee of the instant invention. The wheel balancer provides for measurement of the unbalance in a rotating body and resolves the unbalance in either one or two planes normal to the axis of rotation to the body. A force transducer is mechanically coupled to a rotating shaft on which the rotatable body is mounted and provides an electrical signal which is indicative of the periodic force at the transducer generated by the unbalance mass in the body during rotation. An analog-to-digital converter receives the electrical signal from the transducer and provides a digital word output which corresponds to the instantaneous magnitude of the periodic force. The system includes a control for the analog-to-digital converter so that the digital words are sampled at a predetermined number of angular increments during each revolution of the rotation shaft. A memory is also provided which contains a plurality of stored digital sine and cosine representative quantities, each of which correspond to one or more of the predetermined angular increments. During the time that the rotating shaft is traversing each of the angular increments the control operates on each of the digital words in accordance with the corresponding sine and cosine representative quantities to provide modified quantities having sine and cosine factors. The quantities including the sine and cosine factors are obtained within an execution time which is reduced by appropriate selection of the stored digital sine and cosine representative quantities. The system sums the modified quantities obtained during excursion through each of the angular increments so that data is provided from which a determination of the unbalance mass magnitude and angular location may be made.

SUMMARY OF THE INVENTION

The present invention relates to a method and apparatus for testing the operation of a shaft encoder which provides angular position information outputs indicative of the position of a shaft mounted for rotation in a framework. The shaft is driven by a motor coupled thereto. A processor is provided which operates to monitor the encoder outputs, to control the motor and to provide signals which are coupled to a display which provides indications relative to the encoder output. Accessible memory is associated with the processor which operates to store the angular position information at the instruction of the processor, wherein such information includes a reference indication as well as angular increment indications. The method includes the steps of rotating the shaft and retrieving previously stored encoder outputs from the memory. Angular increment indications are monitored so that a predetermined number of increments is observed between reference indications and so that the direction of shaft rotation is indicated. When the shaft is continuously rotated at a speed within a predetermined speed range a position counter in memory is initiated and the counter is incremented by one for each change in the angular increment indication. The counter content is terminated by the next reference indication so that the count may be compared with the predetermined number of counts and malfunctions due to optical attenuation, mechanical aberrations and circuit malfunctions in components associated with the encoder may be detected. Further, the state of the position increment pulse which provided the last position count is stored in memory and is used to initiate a time counter. Serial time counts are added to the counter until terminated by a position increment pulse state which is distinct from the stored state. The time count for transit through each angular increment is compared with the count for the previous increment and the largest and smallest time counts are stored. The series of time counts is terminated when the angular position count indicates completion of one shaft revolution. In this fashion an indication is provided of the largest and smallest angles separating the signals which provide the angular increment indications so that correct signal phasing for the encoder may be monitored and retained.

The apparatus is for monitoring the operation of an off-the-car wheel unbalance measuring system having a rotationally driven wheel mounting shaft supported in a frame or pedestal, a pair of force transducers mounted in the pedestal in mechanical communication with and spaced along the axis of the shaft, a shaft encoder providing a "home" reference pulse once each shaft revolution and a plurality of angular shaft position increment pulses for each shaft revolution in the form of a dual signal providing encoder states which have a predetermined phase relationship. Structure is adapted to receive and retain a rotating body to be balanced on the shaft, a shaft drive motor is coupled to the shaft, and a first display and a second display are provided. The apparatus includes random access memory receiving current encoder states, and a shaft angular increment count register. Means is provided for coupling the first display to the random access memory to display the current encoder states, and means is provided for coupling the second display to the angular increment count register to display the current shaft position. In this fashion the encoder angular position relative to the shaft as well as encoder electro-optical integrity is monitored.

DESCRIPTION OF THE PREFERRED EMBODIMENT

Figure 1:
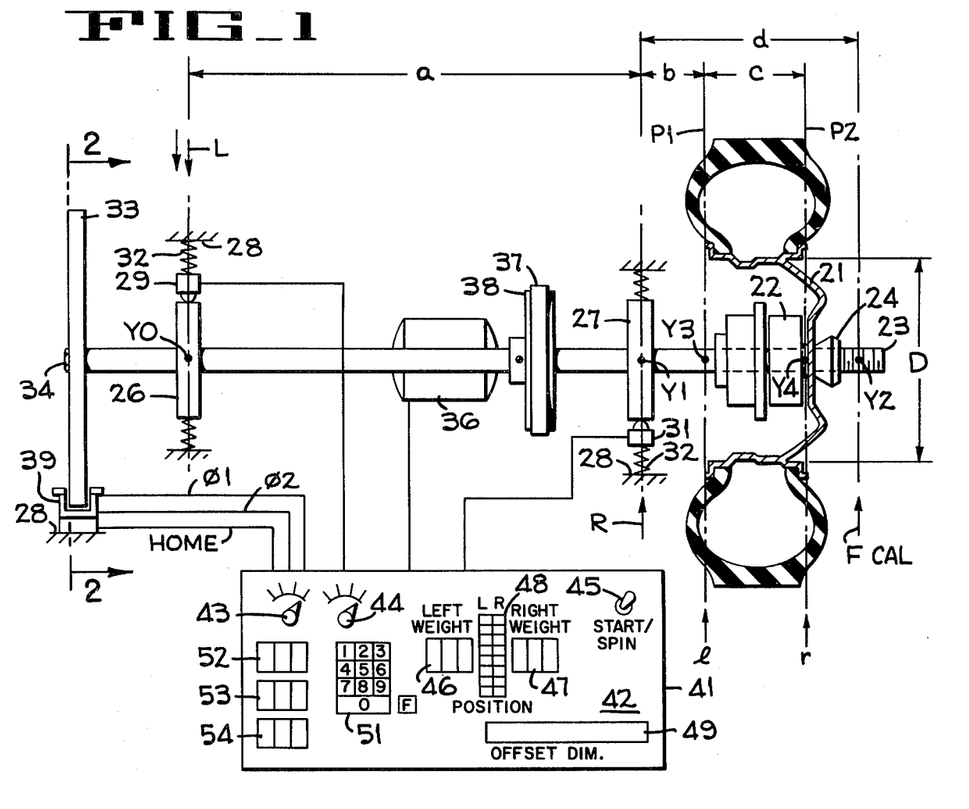
FIG. 1 is a diagrammatic plan view of an unbalance measurement system containing a shaft encoder.

In FIG. 1 of the drawings a conventional mechanical arrangement is shown for measurement of an unbalance mass in a rotating body. The unbalance mass produces an unbalance force when the body is spun. As depicted therein an automobile rim and tire combination 21 is shown as the rotating body securely mounted against a shoulder member 22 which is attached to the end of a rotating shaft 23. The rim portion of the rim and tire combination has the usual centrally disposed hole which fits over the end of the shaft 23. The rim is held tightly in place by a wheel clamp 24 which engages threads formed on the end of the shaft 23. A pair of bearing housings 26 and 27 are resiliently supported within a fixed, rigid framework 28. The shaft 23 is supported on inner bearing members within the bearing housings 26 and 27, thereby being disposed for rotational motion within the framework 28. Left and right force transducers 29 and 31, respectively, are positioned between the framework 28 and the bearing housings 26 and 27. A resilient spring 32 is positioned between each of the force transducers and the framework to maintain the force transducers 29 and 31 in continuous contact with the bearing housings 26 and 27.

An encoder disc 33 is secured to the end of the shaft 23 opposite the end carrying the rim and tire combination 21 by means of a nut 34 and therefore rotates with the shaft. A motor 36 is mounted on the framework 28 functioning to drive the shaft 23 rotationally through a belt 37 and a pulley 38 which is fixedly mounted on the shaft 23.

A photosensor and light source assembly 39 is mounted on the framework 28 adjacent to the edge of the encoder disc 33. Signals provided by the photosensor and light source assembly 39 are connected to circuitry contained within a console 41 having a front panel 42 thereon. The signals provided by the photosensor and light source assembly are three in number, said signals being labeled in FIG. 1 as $\phi 1$, $\phi 2$ and "home", or reference. Force transducers 29 and 31 are also connected to the electronic circuitry contained in console 41 as is the motor 36. The mechanical arrangement of the wheel unbalance measuring device as disclosed herein to this point may be of the type described in U.S. Pat. No. 4,046,017 issued to Hill.

Switches and displays for setting and monitoring the unbalance measurement are shown on the front panel 42. A start/spin switch 45 is seen in FIG. 1 which initiates a shaft spin routine. A multiposition machine mode switch 43 and a multiposition display mode switch 44 are positioned on the front panel 42. The machine mode switch 43 may be set to select a run mode, a calibrate mode or a zero shaft unbalance mode. The display mode switch 44 may be set to select a display of ounces, ounces rounded off, grams or grams rounded off. The displayed units as selected appear in three place left and right unbalance weight indication windows 46 and 47. Left and right position indicators 48 provide angular information indicative of where weights should be attached at the rim of the rim and tire combination 21 to counterbalance the measured unbalance mass. A conventional offset dimension measurement gauge 49 is provided on the front panel 42 from which a convenient reading of the axial position of the rim and tire assembly 21 on the shaft 23 may be obtained. Rim and tire assembly physical parameters are entered into the system by means of a keyboard 51. The offset dimension is entered by appropriate selection of the switches shown on the front panel 42 as are parameters indicative of the wheel diameter and width. The offset is represented in FIG. 1 by the letter "b". The width of the wheel assembly 21 is taken between the two planes, seen as P1 and P2 in FIG. 1, at which counterbalancing weights may be applied to the rims of the wheel assembly. Wheel width is represented in the diagram by the letter "c". The selected diameter, width and offset values are displayed in the three place displays 52, 53 and 54, respectively.

As stated hereinbefore, the force measuring mechanism is similar to that which has been utilized previously inasmuch as forces are sensed by two force transducers which measure all of the forces required to maintain the rotating shaft in a position within the horizontal plane as depicted in the view of FIG. 1. The encoder disc 33 and the photosensor and light source assembly 39 perform as an optical shaft encoder for the wheel balancing shaft 23. A "home" position is measured for the shaft rotation and occurs once for each rotation of the shaft. The "home" position provides an angular reference and rotationally locates a number of calibration constants with respect to the angular position of the shaft. The calibration constants are used to reduce errors introduced into the measurement of unbalance in the rotating body. The unbalance forces are measured when the shaft is spun while loaded with a known calibrating weight and are also measured when the shaft 23 is spun unloaded. Calculations as disclosed in the aforementioned U.S. Pat. 4,285,240 are performed involving the transducer calibration and zero unbalance data, and the results are stored for later use in the solution of unbalance force equations when an unbalanced body is mounted on the shaft and rotated.

The unbalance force equations deal with the unbalance vectors and associated constants which are presumed to be free of any electrical or mechanical noninformation bearing noise signals. The unbalance vectors therefore represent only the sinusoidally varying components of the actual rotating body unbalance, or the calibration weight unbalance, or the unloaded shaft unbalance as the shaft rotates. The freedom from noise presumption is justified by the following considerations. The unbalance force signals from the transducers are digitized and sampled, as will hereinafter be described, at discrete angular increments of shaft rotation as determined by the pattern of apertures 79 in the disc 33. The sampling of data and summing of the sampled data rejects nonharmonic noise having frequencies with periods shorter than the total sampling time as is well known by those of skill in this art. Harmonic noise is rejected by the operations which produce combined quantities containing sine and cosine factors and the subsequent summation. The process performed by the apparatus includes the extraction of the Fourier series coefficients for the fundamental sine and cosine components in the processed data outputs. The processed data is obtained by operating on the force transducer output signals with numbers representative of the sine and the cosine of the shaft angle at the instant the output exists to obtain quantities containing sine factors and quantities containing cosine factors, and by subsequently undertaking independent summations (integrations) of the sine factor quantities and of the cosine factor quantities. The processing is carried out digitally by digitizing the transducer outputs and the quantities representative of the sine and the cosine of the shaft angular position and by performing the operation on the digitized transducer outputs at predetermined angular positions of the shaft. The sine and cosine representative quantities are selected so that they tend to reduce the contribution of harmonics to the processed data. Consequently, the processed data in the form of the sine and cosine summations is relatively free of harmonic content. The developement of the mass unbalance measurement equations is described in United States Patent 4,285,240 and is incorporated herein by reference.

Figure 4:
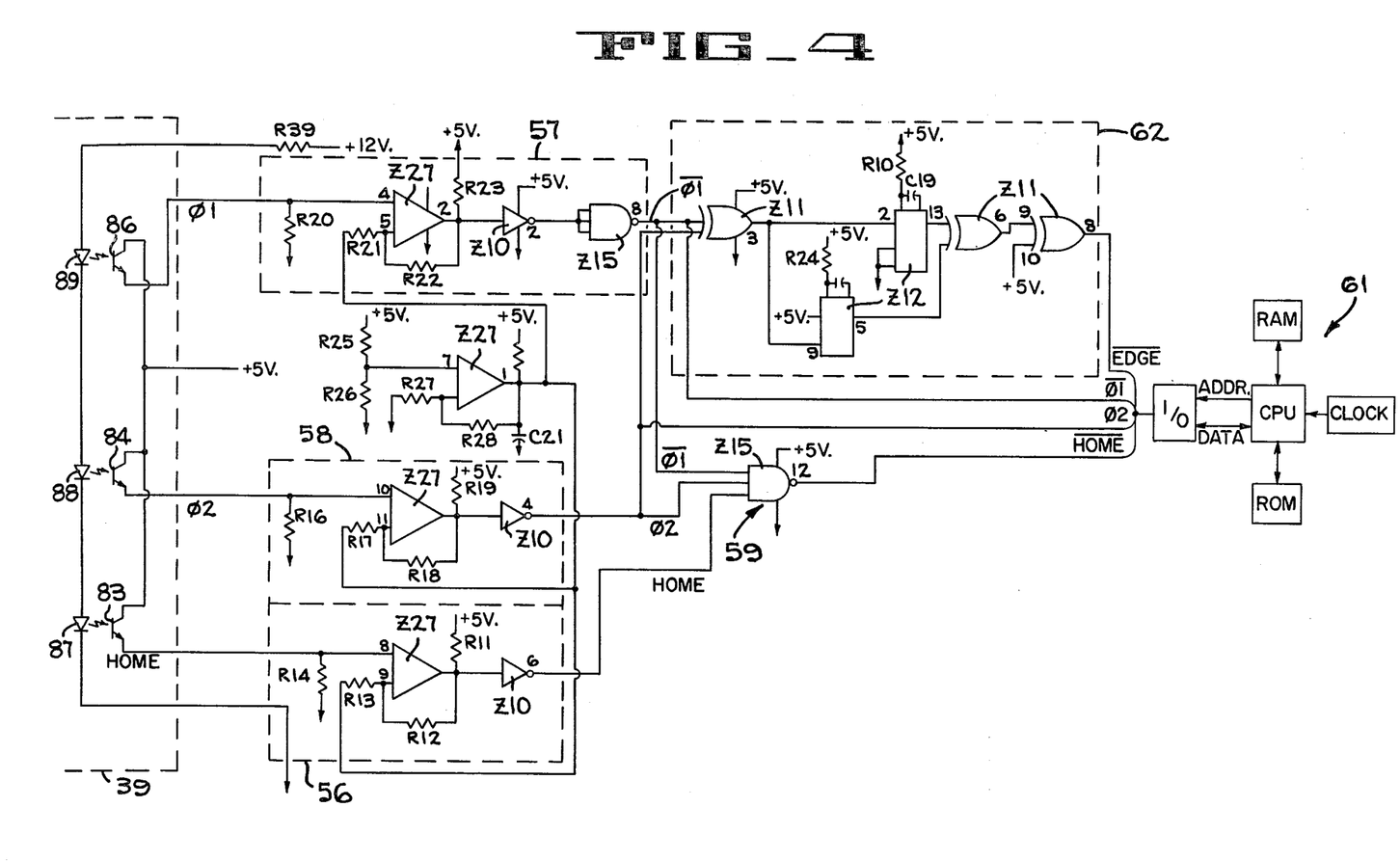
FIG. 4 is an electrical schematic diagram of one portion of the circuitry utilized in the system of FIG. 1.

FIG. 4 shows some of the measurement circuitry sections contained within the console 41. FIG. 4 also shows the photosensor and light assembly 39 described in conjunction with FIG. 1. The photosensor and light assembly 39 operates to provide an angular increment sensing function which includes the provision of a pulse $\phi 2$ together with a pulse $\phi 1$ displaced 90° in phase from the pulse $\phi 2$. A "home" pulse is also provided by the photosensor and light assembly 39 once each revolution of the shaft 23. Each of the "home", $\phi 1$ and $\phi 2$ pulses are conditioned in conditioning circuit segments 56, 57 and 58 respectively to provide convenient pulse shapes and amplitudes. The conditioned "home", $\phi 1$ and $\phi 2$ pulses are coupled to a "home" position definition circuit 59 which provides a reference output coupled to a computer 61. The Fairchild F8 microprocessor may serve as the computer 61. The conditioned $\phi 1$ and $\phi 2$ pulses are coupled to a "times four" multiplication circuit section 62 which provides an "edge" or position interrupt signal also coupled to the computer 61.

Figures 2, 3:
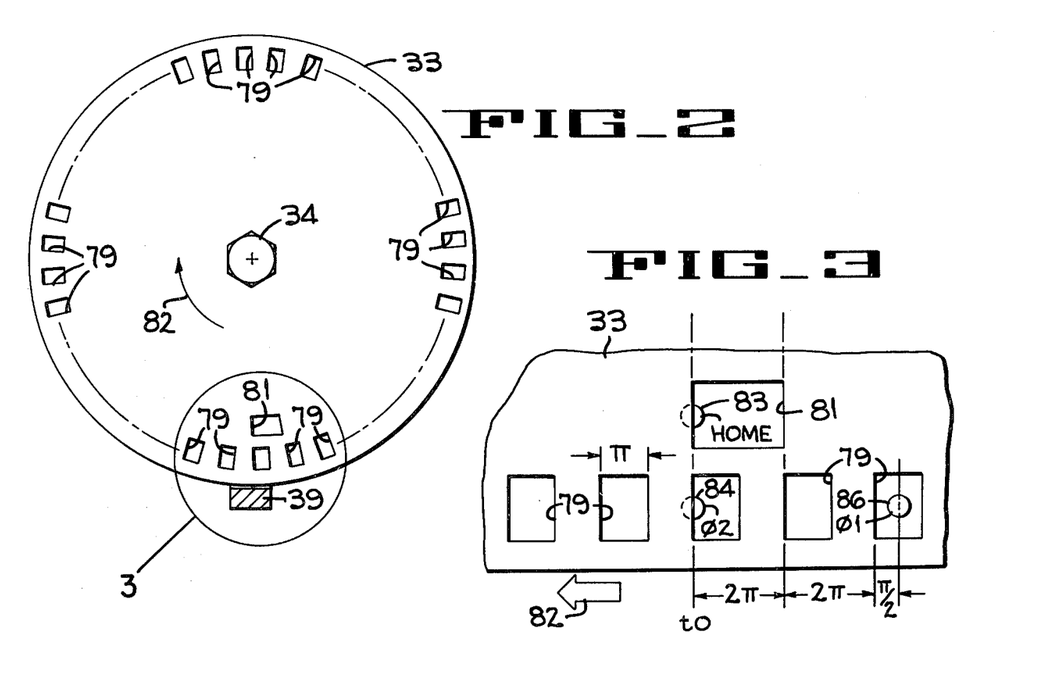
FIG. 2 is an enlarged side elevation of the encoder taken along the line 2—2 of FIG. 1.
FIG. 3 is an enlarged fragmentary detail view of the encoding disc as indicated by the encircled portion 3 of FIG. 2.

In FIG. 2 the encoder disc 33 is shown having a plurality of apertures 79 near the periphery thereof at a predetermined number of angular increments. In the preferred embodiment apertures 79 are equally spaced in angular position about the periphery of the encoder and may be sixty four in number for example. A single "home" aperture 81 is shown also near the periphery of the encoder disc 33. Both the succession of angular increment indicative apertures 79 and the "home" aperture 81 pass between the light source and the photosensors in the photosensor and light assembly 39. Encoder disc 33 is normally rotated with the shaft 23 in the direction shown by the arrow 82 (clockwise) when viewed in the direction of the arrows 2—2 of FIG. 1.

In FIG. 3, a small segment at the periphery of the encoder disc 33 is shown in detail and is layed out in linear rather than angular fashion for the purpose of clarifying the explanation of the positional relationship between the various apertures. Arrow 82 shows the motion of the periphery of the encoder disc 33 which starts its clockwise rotation from an initial position as shown at a time $t_o$. At the time $t_o$ the leading edge of the "home" pulse aperture 81 is clearing a photosensor 83 in the photosensor and light assembly 39 and thereby produces the leading edge of the "home" pulse. At the same instant, $t_o$, the leading edge of one of the apertures 79 is clearing another photosensor 84 in the photosensor and light assembly 39 thereby providing a leading edge for the pulse $\phi 2$. Also at $t_o$ a third photosensor 86 in the assembly 39 is fully exposed to the light source therein through one of the apertures 79 thereby providing the pulse $\phi 1$. It is seen that the pulse $\phi 1$ is displaced from and leads the pulse $\phi 2$ by one quarter of a cycle ($\pi/2$) measured in terms of the period between adjacent apertures 79. It may also be seen in FIG. 3 that the "home" pulse aperture 81 is made wide enough to cover one full cycle between adjacent angular increment indicative apertures 79 for a purpose to be hereinafter explained in conjunction with the schematic of FIG. 4.

Figure 5:
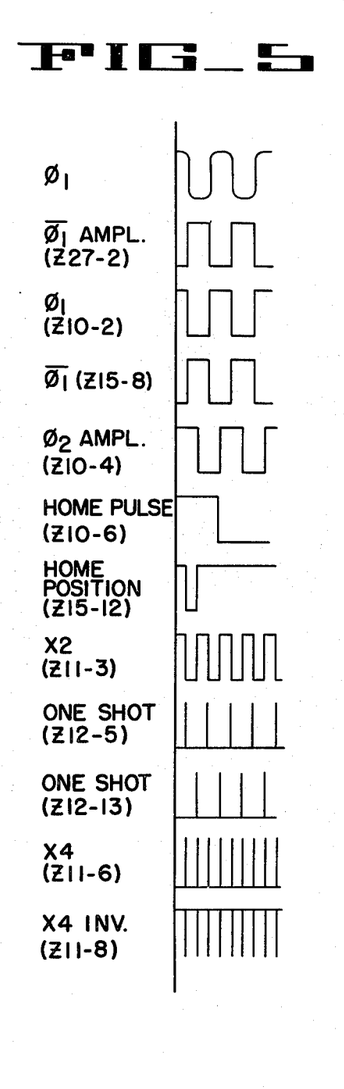
FIG. 5 is a timing diagram showing signals produced in the electrical circuit of FIG. 4.

Turning now to the electrical schematic diagram of FIG. 4, the photosensor and light assembly 39 is seen containing the photosensors 83, 84 and 86 for the generation of the "home" pulse, the $\phi 2$ pulse and the $\phi 1$ pulse respectively. The "home", $\phi 1$ and $\phi 2$ pulses all exhibit high (higher voltage) or low (lower voltage) signal states (FIG. 5) as a function of encoder disc 33 (and therefore shaft 23) angular position. The photosensors in this embodiment are excited by light emitting diodes 87, 88 and 89 as shown in FIG. 4. A voltage divider including resistors R25 and R26 provides positive voltage to the noninverting input at pin 7 of amplifier Z27. The output from pin 1 of the amplifier Z27 serves as a threshold reference and is coupled to each of the noninverting inputs at pins 9, 11 and 5 of three additional amplifying sections of Z27. The three additional amplifying sections of Z27 therefore act as voltage comparators receiving the "home" pulse, $\phi 2$ and $\phi 1$ at the inverting input pins 8, 10 and 4 respectively. In this fashion the signals from the photosensors are squared and amplified to some extent. The squared and amplified pulses are inverted in the inverter sections Z10. The timing diagram of FIG. 5 shows the pulse $\phi 1$ as it is conditioned in the input conditioner 57 of FIG. 4 and as it appears at the output of the inverter Z10 pin 2. The squared and amplified pulse $\phi 2$ and the "home" pulse are shown in FIG. 5 as they are conditioned in circuit segments 58 and 56 of FIG. 4 and as they appear at the output pins 4 and 6 respectively of the inverter sections of Z10 in FIG. 4. The input conditioning circuit 57 for the pulse $\phi 1$ includes a portion of the NAND gate Z15 which receives the amplified and squared pulse $\phi 1$ and provides a $\phi 1$ pulse which is 180° out of phase with the $\phi 1$ pulse. The $\phi 1$ and $\phi 2$ pulses are connected to the computer 61.

The outputs from the input conditioning circuits 56, 57 and 58 seen as $\phi 1$, $\phi 2$ and the "home" pulse in the timing diagram of FIG. 5 are connected to inputs of another section of the NAND gate Z15 which is designated as the "home" position definition circuit 59 as shown in FIG. 4. The NAND gate Z15 will produce a negative going output at pin 12 thereof at the point in time when all three of the aforementioned inputs are in a high state. This may be seen as the "home" position pulse in FIG. 5. The leading edge of the negative going "home" position pulse defines the angular reference position for the rotating shaft 23 and is shown being connected to the computer 61. The "home" position reference is used by the computer to calculate the relative phase of the force vectors sensed by the force transducers 29 and 31.

The schematic of FIG. 4 also shows the output $\phi 1$ and $\phi 2$ from the input conditioning circuits 57 and 58 being connected to inputs of an exclusive OR gate Z11 in the "times four" circuit section 62. A two input exclusive OR gate provides a low state output only when two inputs are simultaneously at the same level: e.g. both in a high state. The output from pin 3 of the OR gate Z11 in FIG. 4 may be seen as the "X2" ("times two") output in FIG. 5. The "X2" output is connected both to the input pin 2 of the one-shot device Z12 and to the input pin 9 of another section of the one-shot device Z13. The one-shot section fired by the input to pin 9 provides a short pulse output of about 150 microseconds at Z12 pin 5 on the negative going edge of the "times two" output from Z11 pin 3. The one-shot section of Z12 fired by an excitation at pin 2 provides a 150 microsecond pulse at output pin 13 thereof on the positive going edge of the "times two" output from Z11 pin 3. The alternating 150 microsecond spikes from the one-shot sections are connected to separate inputs on another section of the exclusive OR gate Z11. The resulting output at pin 6 of the exclusive OR gate Z11 is driven to a high state by each of the alternating input pulses thereby providing a "X4" ("times four") output at pin 6 as shown in FIG. 5. Another section of the exclusive OR gate Z11 is used as an inverter receiving the "times four" output at an input pin 9 and having a positive voltage coupled to another input pin 10. As a result each positive going spike in the "times four" input at pin 9 of the exclusive OR gate Z11 provides a negative going spike at the output pin 8 thereof. If disc 33 has sixty-four apertures 79 therein, 256 negative going pulses will be produced for each revolution of the shaft 23. The inverted "times four" output is connected to the computer 61 as an edge pulse and as a position interrupt pulse.

Figure 6A:
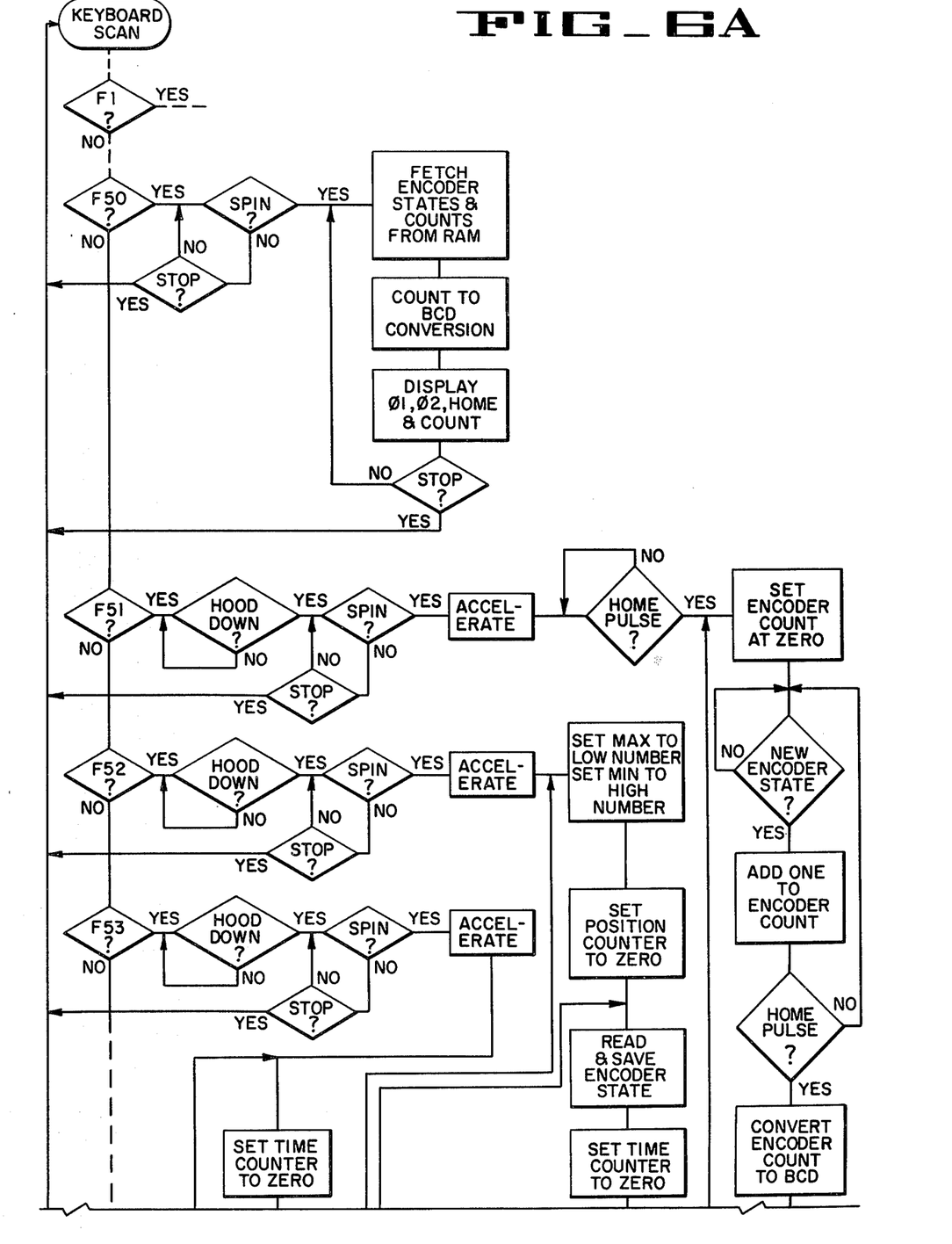
FIGS. 6A and 6B depict a flow chart generally showing the steps in the diagnostic process of the present invention.
Figure 6B:
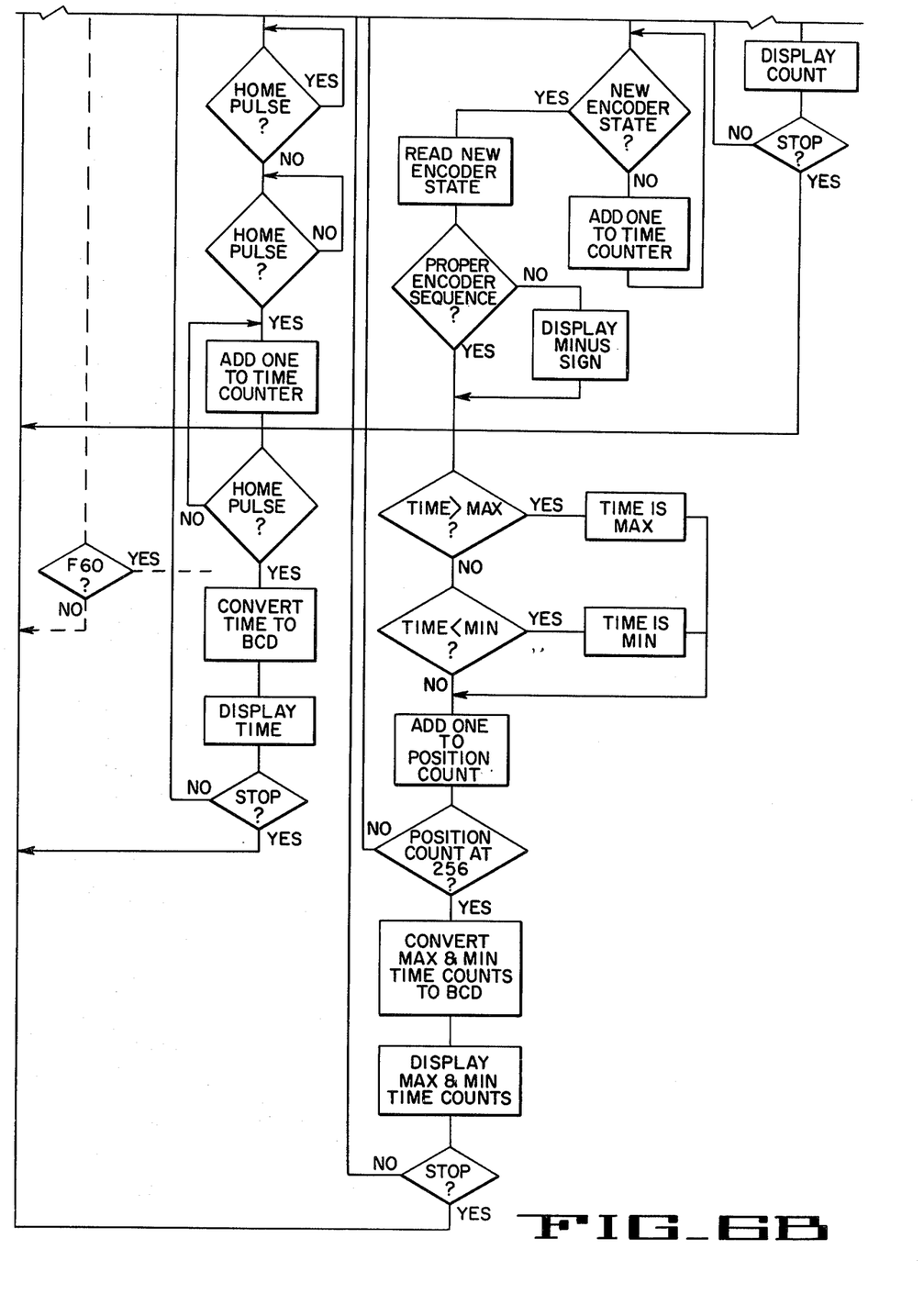

Turning now to FIG. 6 of the drawings, a description of the method for determining encoder accuracy will be undertaken. A keyboard scan is performed which provides a serial "look" by the computer 61 at each of the keyboard functions which may be selected at the keyboard 51 shown in FIG. 1. The functions as shown here are identified by arbitrary code numbers indicated herein for illustration purposes only as extending from code F1 through code F60. Those codes related to the tests of interest are shown connected by solid lines in the flow chart of FIG. 6 while those outside the sphere of interest herein are indicated as connected by dashed lines. It should be noted in the description hereinafter that the "stop" interrogations represent a stop interrupt function which may appear at any point in any of the processes described. The "stop" functions are shown for convenience sake at a point in the method sequence where one cycle in the process is complete and a decision is made as to whether another cycle is to be entered or the process is to be terminated.

Figure 7:
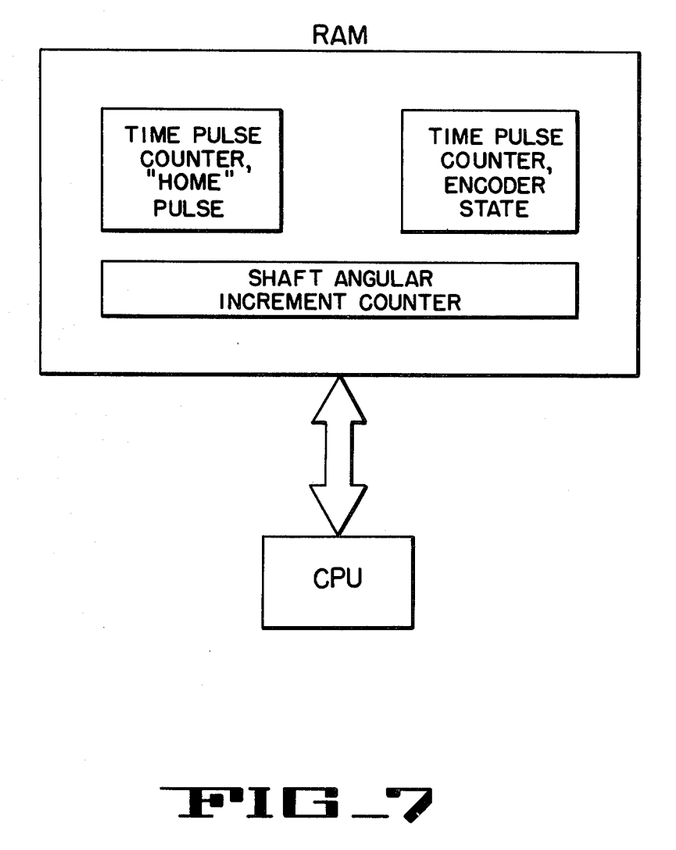
FIG. 7 is a block diagram showing some details of the random access memory of the present invention.

A method of portraying the encoder state and angular position is illustrated in FIG. 6 as being initiated by selection of the code F50 at the keyboard 51 (FIG. 1). Selection of this test together with actuation of the spin switch will cause the current encoder states for ø1, ø2 and the "home" or reference pulses to be retrieved from random access memory. An angular increment count register (FIG. 7) content (referred to the reference position) in random excess memory is also retrieved and converted to binary coded decimal (BCD). The BCD conversion is compatible with the left and right seven segment displays 46 and 47 on the front panel 42. The display 46 provides visual evidence of the current signal state (high or low) for each of the encoder outputs. If the signal is in a 1 high state, the G segment center for the digit in the display coupled to that signal will be illuminated. Display 47 displays a number from 0 to 255 referenced to the "home" position. The number display indicates the number of counts provided by the "X4 inverted" signal of FIG. 5 indicating how far the encoder disc and consequently the shaft 23 has moved from the "home" position. The shaft 23 is turned by hand in performing this test. The test provides for alignment of the encoder disc 33 with a position on the shaft to which a calibration weight is attached for force transducer calibration purposes as explained in U.S. Pat. No. 4,285,240, Gold, issued Aug. 25, 1981. In this embodiment when the encoder is utilized with a wheel balancer the encoder count is desirably at 127 when the test weight attachment point is vertically upward on the shaft. If the count is not attained, the disc 33 is loosened on the shaft 23 and rotated while maintaining the shaft in position until the appropriate encoder count is shown on the right display 47 on the front panel. Moreover, this test affords a check on the integrity of the electro-optical portion of each force transducer circuit. In the event angular increment outputs ("times four" pulses) are missed due to optical obstruction at the encoder, a full revolution count will be something less than the design count of 255 for this embodiment.

The self diagnostic process indicated by the code F51 is initiated by selecting the code at the keyboard, lowering the hood guard when the encoder is utilized with the wheel balancer and actuating the spin switch. The shaft 23 will accelerate to maintain a relatively constant speed within a predetermined speed range, about 480 rpm for the wheel balancer embodiment disclosed herein. While the shaft is continuously spinning a search is made for a "home" or reference pulse. When such a pulse is detected an encoder counter in random access memory (FIG. 7) is set at zero. When a new encoder state is detected, by comparing current and stored states, a count of one is added into the encoder counter. When the next "home" pulse is detected the encoder count is terminated and the count is converted to binary coded decimal. The BCD signal is coupled to the right weight display 47 and the number of encoder transitions for one revolution of the shaft 23 is thereby displayed. As mentioned hereinbefore, the appropriate number in this embodiment is 255 which should appear on the display. The purpose of this test is to perform a check on the integrity of the components associated with each force transducer circuit as mentioned hereinbefore, but to do so at the operational speed of the apparatus. If some number different than the design number appears in the display, potential malfunctions exist relating either to optical attenuation, mechanical aberrations or the circuitry of FIG. 4.

With the selection of the process represented by the code number F52 both the switch indicating the hood or wheel guard is in the lowered safe position and the switch selecting the spin mode must be actuated. Shaft 23 is caused to accelerate to the aforementioned speed within the predetermined speed range and a figure for maximum value reference is set to a low number in random access memory and another figure for a minimum value reference is set to a high number for purposes which will hereinafter become clear. An angular shaft position counter (FIG. 7) is set to a zero count state and the current angular increment state is noted and stored in memory. A second, time pulse counter (FIG. 7) is also initialized. As long as the noted and stored encoder state does not change, a series of time pulses (from a source such as the clock associated with computer 61) are counted at the second counter to thereby provide a time accumulation. The accumulation is terminated when the noted encoder state changes from that previously stored. The angular increment indication from the encoder is obtained as hereinbefore described from a pair of relatively square pulses which are displaced by a predetermined phase angle, preferably approximately 90° in this embodiment. These signals are designated ø1 and ø2 and will in combination take on one of four combined states. They will either both be low (state 0-0), ø1 will be low and ø2 will be high (state 0-1), both be high (state 1-1) or ∅1 will be high and ∅2 will be low (state 1-0). Following the termination of the time accumulation in the second counter the new encoder state will be read and compared with the previously stored state. It may be seen from the foregoing description of the state sequence that the direction of shaft rotation may thereby be determined. If the rotation direction is considered to be normal, then proper encoder sequence is indicated. If it is opposite to that considered to be normal, a symbol so indicating is displayed in the left weight display 46.

The time accumulated in the second time pulse counter is compared with the low number (maximum value reference) initially set in random access memory and if it is greater the newly obtained time is recorded as a maximum in memory. On the other hand if it is less than the high number (minimum value reference) recorded for purposes of minimum value comparison, it will be recorded in memory as a minimum. One count is added to the shaft position count register and if the shaft position count is less than 256 the last encoder state is stored and the time pulse counter is reinitialized. Time pulses are once again accumulated in the time pulse counter until the next new encoder state appears and the maximum and minimum comparisons are made with the previously obtained maximum and minimum time counts. Upon completion of 256 such counts and comparisons maximum and minimum counts are converted to binary coded decimal and displayed on the left and right weight displays 46 and 47 respectivhely on the front panel. The process is repeated to obtain maximum and minimum times in milliseconds between the two angular increment indicative signals. In this fashion while the sequence of the angular increment signals may be proper if the margin between them as indicated by the maximum and minimum times places the signals close to being in an erroneous phase relation, adjustment of the two signals (by physically moving the photosensors 84 and 86, for example) may be made to bring them closer to the preferable 90° separation. The process is terminated by selecting the "stop" function which returns the process to the keyboard scan.

When the self diagnostic method represented by the code F53 is selected and the hood guard and spin switches are both actuated the shaft 23 is once again accelerated to a speed within the aforementioned predetermined speed range. A time counter (FIG. 7) in random access memory is initialized and a search is made for a "home" pulse. The process may only be started if no "home" pulse is found when the process is selected. If a "home" pulse is partly passed when the process is entered that "home" pulse will be ignored since it is desirable to initiate the process on the steep leading edge of the "home" pulse. Once transition from no "home" pulse to the presence of a "home" pulse is sensed a series of time based pulses are directed to accumulate in the time counter. The next home pulse terminates the time count and the count is converted to binary coded decimal and displayed on the right weight display 47 in milliseconds. Thereafter unless the routine is manually selected to be stopped and returned to keyboard scan as described hereinbefore the leading edge of a subsequent "home" pulse is sought, detected, the time count accumulated, the time count terminated by the next occurring "home" pulse and the time displayed again in milliseconds. In this fashion the stability of the shaft speed may be monitored as the time for completing a single revolution of the shaft is constantly monitored and displayed as the shaft is continuously spun.

Although the best mode contemplated for carrying out the present invention has been herein shown and described, it will be apparent that modification and variation may be made without departing from what is regarded to be the subject matter of the invention.

What is claimed is:

1. A method of determining a shaft encoder operating characteristics wherein the encoder provides angular position information outputs indicative of the position of a shaft which is mounted for rotation in a framework and which is driven by a motor coupled thereto, wherein a display is provided and a processor is included to monitor the encoder outputs and to provide signals which are coupled to the display and which are indicative of data obtained with respect to the encoder outputs, wherein memory is associated with the processor, such memory operating to store the angular position information, and wherein such information includes a reference indication and angular increment indications, comprising the steps of rotating the shaft, retrieving the stored angular position information from memory, retrieving the current angular increment indications from memory during shaft rotation, comparing current angular increment indications with stored information, and updating the stored angular position information with the current angular increment and reference indication information where the comparison is indicative of change therein, so that when the stored angular position information is coupled to the display, indications are provided thereby of the number of angular increments between reference indications and of the current encoder angular position.

2. The method of claim 1 wherein the shaft is manually rotated together with the steps of converting the retrieved angular position information to display-compatible signals and displaying the information represented by the last named signals on the display.

3. The method of claim 1 together with the step of continuously rotating the shaft at a speed within a predetermined speed range, and wherein the step of retrieving current angular increment indications comprises the steps of sensing the reference indication, initiating a counter with the sensed reference, changing the counter content by one for each angular increment indication, and comparing the counter content between reference indications with a predetermined number, whereby optical attenuation, mechanical aberrations and circuit malfunctions in components associated with the encoder may be detected by the comparison.

4. The method of claim 3 together with the steps of converting the counter content to display-compatible signals and displaying the information represented by the last named signals on the display.

5. The method of claim 1 together with the steps of continuously rotating the shaft at a speed within a predetermined speed range, wherein the step of updating includes the step of storing the angular increment state which provided the last increment count in memory, initiating a time counter with the last angular increment sensed, wherein the step of retrieving current angular increment indications includes the step of adding serial time counts to the time counter until an angular increment indication state occurs which is changed from the stored state, comparing the time count for each angular increment with the count for the previous increment, storing the largest and the smallest time counts obtained, terminating the time counts when the angular increment count indicates completion of a shaft revolution, and displaying an indication of the largest and smallest time counts, whereby indication of largest and smallest angle separation between angular increment indications is provided.

6. The method of claim 5 wherein the angular increment indications are obtained from dual signals having a predetermined sequence of occurrence for a given shaft rotation direction, and wherein the step of comparing includes the steps of sensing the increment indication sequence, and displaying a symbol indicative thereof in accordance with the sequence.

7. The method of claim 1 together with the steps of continuously rotating the shaft at a speed within a predetermined speed range, setting a time counter to zero, sensing the reference indication, initiating addition of serial time counts to the time counter by the sensing of the reference indication, terminating the time count when the next reference indication occurs, and displaying the count obtained between successive pairs of reference pulses, whereby an indication of shaft speed stability is obtained.

8. The method of claim 7 wherein the reference indication is a steep leading edge pulse, together with the step of ignoring a sensed reference pulse if it is sensed after the steep leading edge has passed.

9. A method of determining a shaft encoder operating characteristics wherein the encoder provides outputs in the form of an angular reference indication and angular increment indications, wherein the encoder is operatively coupled to a rotatable shaft mounted in a framework and driven by a motor coupled thereto, wherein a display is provided and a processor is included to monitor the encoder outputs and to provide signals coupled to the display which are indicative of the states of the encoder outputs, and memory associated with the processor operating to store the angular position information, wherein such information includes a reference indication and angular increment indications, comprising the steps of continuously rotating the shaft at a speed within a predetermined speed range,
counting the angular increment indications resulting from the shaft rotation,
retrieving the state of the angular increment outputs from memory,
initiating a time pulse counter when a change in angular increment output state occurs,
adding serial time counts to the time pulse counter,
terminating each time count when a subsequent angular increment output state change occurs,
comparing the time pulse count accumulated during the period of each angular increment output with the count for the period of the previous increment output,
storing the greatest and the least time counts compared, and
terminating the time counts when the angular increment count indicates a complete shaft revolution.

10. The method of claim 9 wherein the angular increment indications are dual signals having predetermined phase relation for a given shaft rotation direction, together with the steps of sensing the dual signal phase, and displaying an indication of the serial time counts and the signal phase, whereby phase margin maximum and minimum and signal phase relation may be monitored.

11. The method of claim 9 together with the steps of sensing the reference indication, initiating another time pulse counter with a reference indication, adding serial time counts to the other time pulse counter, terminating each of the other time pulse counts with the next reference indication, and displaying an indication of the other time count, whereby an indication of shaft speed stability is obtained.

12. The method of claim 11 wherein the reference indication is a steep leading edge pulse, together with the step of ignoring a sensed reference pulse if it is sensed after the steep leading edge has passed.

13. A method of determining stability of the rotational speed of a shaft encoder which provides outputs in the form of an angular reference indication and angular increment indications, wherein the encoder is operatively coupled to a rotatable shaft mounted in a framework and driven by a motor coupled thereto, wherein a display is provided and a processor is included to monitor the encoder outputs and to provide signals coupled to the display which are indicative of the states of the encoder outputs, and memory associated with the processor operating to store the angular position information, wherein such information includes a reference indication and angular increment indications, comprising the steps of continuously rotating the shaft at a speed within a predetermined speed range,
sensing the reference indication,
inhibiting a time pulse counter if the angular reference output indication is present at a first sensing instance,
initiating the time pulse counter upon sensing transition from no output indication, to reference output indication,
adding serial time pulse counts to the time pulse counter after counter initiation,
terminating each count of serial time pulses with the next reference indication,
and displaying an indication of the time pulse count for a series of successive shaft revolutions, whereby stability of the count over successive shaft revolutions provides an indication of shaft speed stability.

14. Apparatus for portraying the operation of an off-the-car wheel unbalance measuring system having a rotationally driven wheel mounting shaft supported in a frame or pedestal, a pair of force transducers mounted in the pedestal in mechanical communication with and spaced along the shaft, a shaft encoder providing a "home" reference pulse once each shaft revolution and a plurality of angular shaft position increment pulses for each shaft revolution in the form of a dual signal providing encoder states which have a predetermined phase relationship, structure adapted to receive and retain a rotating body to be balanced on the shaft, a shaft drive motor coupled to the shaft and operating to drive the shaft rotationally, a first display and a second display, comprising random access memory receiving current encoder states, and a shaft angular increment count register, means coupling the first display to said random access memory to display the current encoder states, and means coupling the second display to said angular increment count register to display the current shaft position, whereby encoder angular position relative to the shaft as well as encoder electro-optical integrity is monitored.

15. Apparatus as in claim 14 wherein said random access memory includes said angular increment count register, said count register comprising means for resetting said register upon receiving said "home" pulse, whereby the second display exhibits the number of encoder transitions per shaft revolution.

16. Apparatus as in claim 14 together with an additional counter and means for providing a series of time spaced pulses having a frequency such that a plurality of said time spaced pulses occurs within the duration of predetermined combinations of the encoder states at a predetermined shaft rotation speed, said additional counter operating to count the accumulation of said time spaced pulses during any one combination of encoder states and to reset upon a change of the encoder state, means for detecting the maximum and the minimum counts accumulated in said additional counter during one revolution of the shaft, whereby data is provided for determination of phase margin between the encoder states.

17. Apparatus as in claim 14 together with an additional counter, means for providing a series of time spaced pulses having a frequency higher than the frequency of "home" pulses at a predetermined shaft rotation speed, and means for resetting said additional counter when a "home" pulse is sensed, said additional counter operating to count the accumulation of said time spaced pulses between "home" pulses, whereby data is provided over a series of shaft revolutions indicative of shaft speed stability.

* * * * *